United States Patent [19]

Tolley

[11] 4,098,868
[45] Jul. 4, 1978

[54] PRODUCTION OF TITANIUM TRICHLORIDE FROM ILMENITE

[75] Inventor: William K. Tolley, Arlington Heights, Ill.

[73] Assignee: UOP Inc., Des Plaines, Ill.

[21] Appl. No.: 791,621

[22] Filed: Apr. 27, 1977

[51] Int. Cl.² .......................................... C01G 23/02
[52] U.S. Cl. ...................................... 423/83; 423/85; 423/492
[58] Field of Search ................... 423/82, 83, 85, 86, 423/492, 493, 488

[56] References Cited

U.S. PATENT DOCUMENTS

| | | | |
|---|---|---|---|
| 3,236,596 | 2/1966 | Zirngibl et al. | 423/83 |
| 3,407,033 | 10/1968 | Rüter et al. | 423/83 |
| 3,607,012 | 9/1971 | Schossberger et al. | 423/83 |
| 3,777,013 | 12/1973 | Soverini | 423/488 |
| 3,929,962 | 12/1975 | Shioh | 423/83 |

Primary Examiner—O. R. Vertiz
Assistant Examiner—Brian E. Hearn
Attorney, Agent, or Firm—James R. Hoatson, Jr.; Raymond H. Nelson; William H. Page, II

[57] ABSTRACT

Titanium metal values may be recovered from a titanium bearing source by roasting said source in a reducing atmosphere, leaching the source with aqueous hydrogen chloride at an elevated temperature, cooling and saturating the leached solution with gaseous hydrogen chloride to precipitate hydrated ferrous chloride, separating the precipitated ferrous chloride from the soluble titanium chloride, raising the temperature of the solution to precipitate the titanium, separating and recovering the crystallized titanium compound.

4 Claims, 1 Drawing Figure

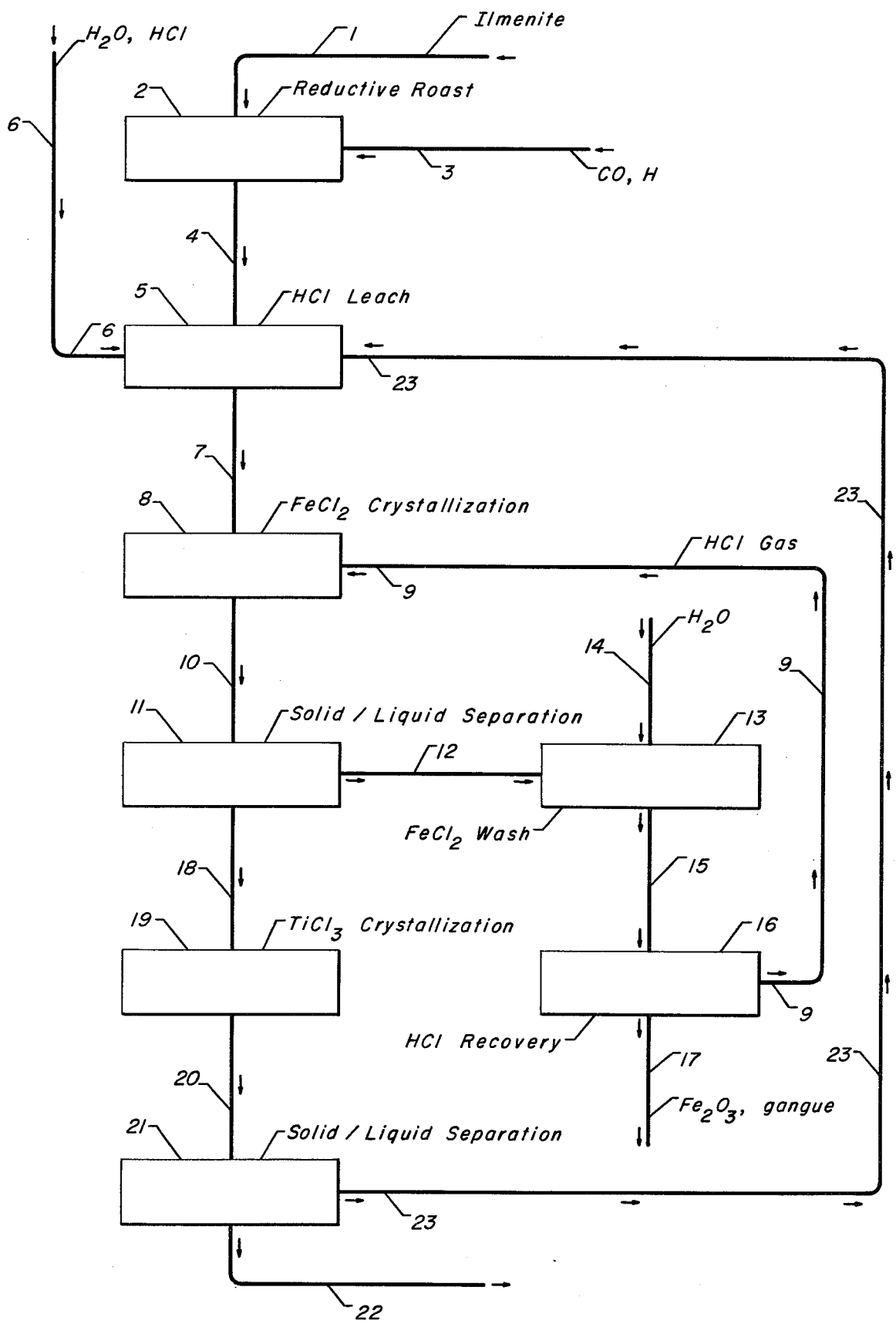

PRODUCTION OF TITANIUM TRICHLORIDE FROM ILMENITE

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

In contradistinction to the previous method of obtaining titanium from a titanium bearing source, it will hereinafter be shown in greater detail that it is possible to selectively crystallize iron and titanium in separate steps whereby a more efficient separation of the two metals can be accomplished thereby rendering the obtention of relatively pure titanium in a more economical manner.

This invention relates to a novel method for obtaining titanium metal values from a titanium bearing source. More specifically, the invention is concerned with a process for recovering titanium from a titanium bearing source such as ilmenite whereby a sharper separation of titanium from impurities contained therein may be accomplished.

It is therefore an object of this invention to provide an improved process for the production of titanium.

A further object of this invention is to provide a hydrometallurgical process for the production of titanium from titanium bearing sources.

In one aspect an embodiment of this invention resides in a process for obtaining titanium metal values from a titanium bearing source which comprises the steps of: (a) subjecting said titanium bearing source to a reductive roast; (b) leaching the resultant roasted source with aqueous hydrogen chloride at an elevated temperature; (c) cooling and saturating the leached solution with gaseous hydrogen chloride to precipitate ferrous chloride; (d) separating the precipitated ferrous chloride from the soluble titanium compound; (e) raising the temperature of the solution of the titanium compound to precipitate said titanium compound; and (f) separating and recovering the crystallized titanium compound from the leach liquor.

A specific embodiment of this invention is found in a process for obtaining titanium metal values from a titanium bearing source which comprises subjecting said titanium bearing source to a reductive roast at a temperature in the range of from about 600° to about 900° C., leaching the resultant roasted source with aqueous hydrogen chloride at a temperature in the range of from about 80° to about 110° C., cooling and saturating the leached solution with gaseous hydrogen chloride at a temperature in the range of from about 0° to about 20° C. to precipitate ferrous chloride, separating the precipitated ferrous chloride from the soluble titanium compound, heating the solution of the soluble titanium compound to a temperature ranging from about 20° to about 30° C. to precipitate the titanium compound in the form of titanium trichloride, separating and recovering the resultant crystallized titanium trichloride from the leach liquor.

Other objects and embodiments will be found in the following further detailed description of the present invention.

As hereinbefore set forth the present invention is concerned with an improved process for obtaining titanium metal values from a titanium bearing source such as ores including ilmenite, rutile, etc. The improvement comprises treating the titanium in a +3 valence state rather than a +4 valence state. The process is effected by subjecting a titanium bearing source which also contains other metals, principally iron, to a reductive roast at an elevated temperature which will range from about 600° to about 900° C. or more in the presence of a reducing gas such as hydrogen or carbon monoxide. In the preferred embodiment, the reductive roast is effected on a metal bearing source such as an ore, which has been crushed to a particle size less than about 100 mesh, at a temperature of about 750° C. for a period ranging from about 0.5 up to about 2 hours or more. The reducing atmosphere which is used to accomplish the purpose of the roast usually comprises a mixture of about 50% carbon monoxide and 50% hydrogen with an excess of reductant being utilized in order to completely reduce the iron which is present in the system to the metal. Following the reductive roast of the metal bearing source, the source is then subjected to an aqueous hydrogen chloride leach which is also effected at an elevated temperature usually in the range of from about 80° to about 110° C. for a period of time ranging from about 0.25 hours up to about 1 hour or more in duration. Upon completion of the leach step, the resulting solution is thereafter cooled to a temperature ranging from about 0° to about 20° C. in order to effect a crystallization or precipitation of the ferrous chloride. The cooled solution, which is maintained in the subambient range hereinbefore set forth by external means such as an ice bath, cooling coils, etc., is then saturated with gaseous hydrogen chloride in order to insure a complete precipitation of the iron. After subjecting the solution which contains solid ferrous chloride and soluble titanium chloride to the aforesaid saturation step for a period of time which may range from about 0.5 up to about 2 hours or more in duration, the solution is subjected to a solid/liquid separation whereby the solid ferrous chloride crystals are separated from the soluble titanium compound contained in the leach liquor.

The solid ferrous chloride crystals may then be washed with water and treated at an elevated temperature of about 250° C. whereby gaseous hydrogen chloride is removed and recycled to the saturation and precipitation step of the process, the solids which comprise ferric oxide and gangue being removed and recovered.

The pregnant leach liquor which contains the soluble titanium chloride compound is then passed to a warming stage wherein the temperature is raised to a range of from about 20° to about 30° C. In this warming stage the soluble titanium chloride will precipitate out as hydrated titanium trichloride crystals. Thereafter the desired titanium trichloride may be separated from the leach liquor by any means known in the art such as decantation, filtration, etc., and passed to storage as such or converted to titanium dioxide or titanium metal.

BRIEF DESCRIPTION OF DRAWING

The present invention will be further illustrated with reference to the accompanying drawing which sets forth a flow diagram of the process of this invention. It is to be understood that various valves, pumps, etc., have been eliminated as not being essential to the complete understanding of the present invention. However, the utilization of these, as well as other similar appurtenances, will become obvious as the drawing is described.

A titanium bearing source such as ilmenite ore is charged through line 1 to a reductive roast apparatus 2. In this apparatus the ore source is subjected to a reductive roast at a temperature in the range hereinbefore set forth in the presence of a reductant which comprises a mixture of hydrogen and carbon monoxide gas, the reductant being charged to the apparatus through line 3. After undergoing the reductive roast the source is withdrawn from this apparatus through line 4 and passed to a leaching step in leach apparatus 5. In this leaching step which is effected at an elevated temperature ranging from about 80° to about 110° C., the source is contacted with an aqueous hydrogen chloride leach solution which passes into zone 5 through line 6. After being leached at this temperature for a predetermined period of time, the leach solution is withdrawn through line 7 and passed to crystallization zone 8. As hereinbefore set forth the crystallization zone is maintained at a temperature ranging from about 0° to about 20° C. At this temperature and in this zone, the leach solution is contacted with gaseous hydrogen chloride in order to saturate the solution and insure complete precipitation of the ferrous chloride. The gaseous hydrogen chloride is charged to zone 8 through line 9, the source of said hydrogen chloride gas being hereinafter described in greater detail. After crystallization of the ferrous chloride in zone 8, the mixture comprising the solid ferrous chloride crystals and the soluble titanium chloride in the leach liquor is withdrawn through line 10 and passed to a solid/liquid separation zone 11. In this zone the solid ferric chloride crystals are separated from the pregnant leach liquor containing the soluble titanium chloride through line 12 and passed to a ferrous chloride wash zone 13. In this zone the crystals are washed with water which is charged to zone 13 through line 14. After washing, the ferrous chloride crystals are passed through line 15 into a hydrogen chloride recovery zone 16. In the hydrogen chloride recovery zone, the crystals are subjected to a heat treatment which may range from about 200° to about 300° C. whereby the ferrous chloride is converted to ferric oxide and the gaseous hydrogen chloride which is driven off is collected and passed through line 9 to crystallization zone 8. The solid ferric oxide along with any gangue is withdrawn through line 17 and passed to storage for further separation.

The liquid leach liquor which remains after separation from the ferrous chloride, said separation being accomplished by decantation, filtration, centrifugal means, etc., are passed through line 18 to crystallization zone 19. In this zone the leach liquor is warmed to a temperature ranging from about ambient (20° C.) up to about 30° C. or more. After allowing the leach liquor to remain in crystallization zone 19 for a period of time which is sufficient to completely crystallize the titanium trichloride the mixture is withdrawn through line 20 to separation zone 21. This separation zone may comprise a centrifuge, filtration unit, etc., whereby the solid hydrated titanium trichloride is withdrawn through line 22 while the leach liquor which contains aqueous hydrogen chloride may be recycled through line 23 back to leaching zone 5. The solid hydrated titanium trichloride may then be subjected to conventional means of recovery whereby the titanium metal value may be recovered as titanium metal, titanium dioxide, etc.

By utilizing the process of the present invention it is possible to treat the aqueous titanium as titanium in a +3 valence state, as evidenced by the formation of titanium trichloride, instead of titanium in a +4 valence state as is required when treating titanium dioxide. The formation of titanium in a +3 valence state is effected by utilizing the iron metal which is produced during the reductive roast of the ore as the reducing agent thereby producing titanium in the aforesaid +3 valence state rather than in the +4 valence state. In addition, by utilizing a relatively low temperature, i.e., 750° C. in the reductive roasting step, it is possible to produce the titanium in a +3 valence state in the leach step in contrast to prior methods which require a high temperature roast in order to reduce the titanium dioxide. In addition, by controlling the temperature and acidity during the first crystallization step, it is possible to produce ferrous chloride and titanium trichloride in two distinct physical phases, that is, the ferrous chloride in a solid state and the titanium trichloride in a dissolved state. The combination of all of these advantages will thus permit the obtention of the desired titanium value in a more economical process in contrast to the relatively higher costs which are attendant when utilizing prior methods.

The following examples are given for purposes of illustrating the process of this invention. However, it is to be understood that these examples are given merely for purposes of illustration, and that the present process is not necessarily limited thereto.

EXAMPLE I

An ilmenite ore was crushed and sized to -100 mesh Tyler. The ilmenite ore was analyzed and found to contain 20% titanium and 44% iron. Following this, 100 grams of the sized ilmenite ore was then placed in a rotating quartz tube and heated to a temperature of 750° C. under an atmosphere of dry nitrogen. Upon reaching this roasting temperature, the ore was roasted for 1 hour under a stream of reducing gas consisting of 320 ml/minute of carbon monoxide and 320 ml/minute of hydrogen. At the end of the 1-hour period, the ore was cooled under a nitrogen stream until it had reached room temperature. The reduced ore was analyzed and found to contain 22% titanium and 46% iron.

A large volume of leach solution consisting of 850 grams of concentrated hydrochloric acid was tested through the process to give a spent leach liquor. This spent leach liquor was divided into 300 cc samples and mixed with 50 grams of the reduced ilmenite ore. The slurry was heated to a temperature ranging from 85° to 100° C. under agitation for a period of 1 hour and filtered. The solution was allowed to cool and 102 grams of ferrous chloride were recovered prior to acid saturation at 5° C.

One hundred ninety two cc of the leach liquor which contained 184 grams/liter of titanium in a +3 valence state, 18.9 grams/liter of iron in a +2 valence state and 388 grams/liter of chloride ion were placed in a flask and cooled from room temperature to about 5° C. by means of an ice bath. The solution was then purged with hydrogen chloride gas until the solution was saturated. After allowing the solution to stand for a period of 0.5 hours, during which time the ferrous chloride precipitated, the solids were removed by filtration and analyzed, said analysis disclosing the presence of 31.3% iron and 1.8% titanium, the total weight of said solids being 4.39 grams. The pregnant leach liquor which contained the titanium trichloride was warmed to a temperature of 25° C. while maintaining the solution in an oxygen-free atmosphere. Upon reaching 25° C., the titanium trichloride precipitated and was removed by filtration. The crystals which consisted of 10.8 grams were analyzed and found to contain 21.4% titanium, 0.032% iron and 0.46% vanadium. It is therefore readily apparent that it is possible to obtain a selective precipitation of the metal values which are present in an ilmenite ore, the major portion of the iron in the ore being removed during the low temperature saturation step while the titanium remained in solution, following which after removal of the solid iron compound it is possible to warm the solution to precipitate and recover the desired titanium in a relatively pure state.

EXAMPLE II

This example illustrates that the saturation of the leach source may be effected at a temperature higher than that utilized in Example I. As in Example I an ilmenite ore was crushed in a size to -65 mesh Tyler. The ore was again roasted at a temperature of 750° C. under a stream of reducing gas consisting of equal amounts of carbon monoxide and hydrogen. Thereafter the ore was cooled under a nitrogen steam until it had reached room temperature. The ore was then leached with 300 cc of a spent leach liquor from a previous titanium trichloride crystallization step, said spent leach liquor containing concentrated hydrochloric acid. The leach was effected at a temperature ranging from about 85° to about 100° C. for a period of 1 hour, 1.92 grams of solid residue being removed from the leach liquor. The leach liquor was then cooled to room temperature during which time ferric chloride crystallized out. The crystals comprising 58.39 grams of ferrous chloride hydrate was separated from the leach liquor. The leach liquor which consisted of 213 cc was analyzed and sound to contain 160 grams/liter of titanium, 22 grams/liter of iron and 420 grams/liter of chloride ions. Thereafter the 213 cc of this solution which contained 160 grams/liter of titanium in a +3 valence state, 22.2 grams/liter of iron in a +2 valence state and 420 grams/liter of chloride ion were cooled to 20° C. in an ice bath and sparged with hydrogen chloride gas to increase the aforesaid concentration and decrease the ferrous chloride solubility. Sparging was continued for a period of 0.5 hours following which the solids were filtered off. The 5.9 grams of solids were analyzed and found to contain 26.5% iron and 3% titanium. The filtrate was allowed to warm to 25° C. causing titanium trichloride to crystallize and precipitate out. The solids were filtered from the leach liquor and the 41.8 grams of solids were found to contain 18.7% titanium, 0.25% iron and 0.35% vanadium.

EXAMPLE III

To recover titanium values in a desirable state, the titanium trichloride crystals were dried under nitrogen and chlorinated by placing the crystals in a furnace and passing a stream of chlorine and carbon monoxide over said crystals at an elevated temperature of about 250° C. to recover titanium tetrachloride. The chlorination residue was a reddish colored solid, analysis of which showed the solids to contain 71% titanium, less than 0.1% iron and from about 0.05 to about 0.5% vanadium.

In addition to the chlorination of titanium trichloride to titanium tetrachloride, it is also possible to obtain the titanium in the form of titania (titanium dioxide). This conversion of the titanium trichloride was accomplished by reacting titanium trichloride with hematite (ferric oxide at an elevated temperature of about 80° C.

I claim as my invention:

1. A process for obtaining titanium metal values from ilmenite ore which comprises the steps of:
    (a) subjecting said ore to a reductive roast at a temperature of from about 600° to about 900° C.;
    (b) leaching the resultant roasted ore with aqueous hydrogen chloride at an elevated temperature to form a solution of titanium trichloride and ferrous chloride;
    (c) cooling and saturating the leach solution with gaseous hydrogen chloride to precipitate ferrous chloride;
    (d) separating the precipitated ferrous chloride from titanium trichloride solution;
    (e) raising the temperature of the last-named solution to about 20° to about 30° C. to precipitate hydrated titanium trichloride; and
    (f) separating and recovering the crystallized titanium trichloride from the leach liquor.

2. The process as set forth in claim 1 in which said roasted ore is leached at a temperature in the range of from about 80° to about 110° C.

3. The process as set forth in claim 1 in which said leach solution is saturated with hydrogen chloride at a temperature in the range of from about 0° to about 20° C.

4. The process as set forth in claim 1 in which said leach liquor is recycled to the leaching step.

* * * * *